April 12, 1960     A. M. SMITH     2,932,542
DYNAMOMETER TRUNNION BEARING
Filed May 21, 1954
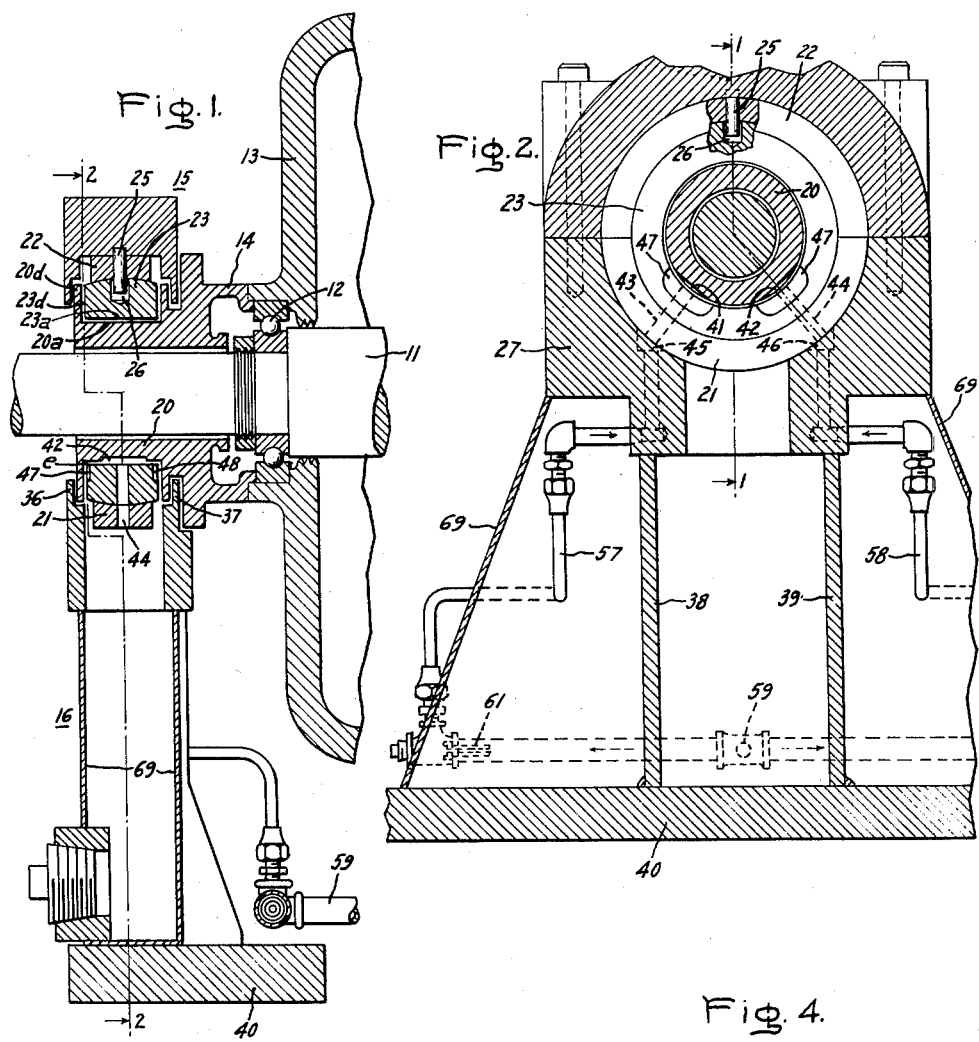
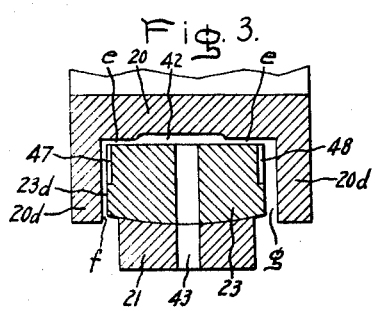
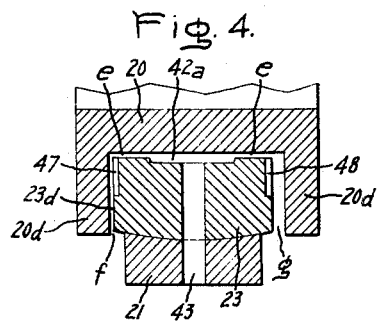
Inventor:
Arthur M. Smith,
by    *Claude A. Mott*
His Attorney.

United States Patent Office 2,932,542
Patented Apr. 12, 1960

2,932,542

DYNAMOMETER TRUNNION BEARING

Arthur M. Smith, Fort Wayne, Ind., assignor to General Electric Company, a corporation of New York Application May 21, 1954, Serial No. 431,395

3 Claims. (Cl. 308—9)

My invention relates to bearings and has particular significance in connection with dynamometer trunnion bearing mounting, alignment and thrust capacity.

A primary problem in the construction of dynamometers and other force measuring devices has been the provision of means to eliminate the friction in the trunnion bearings which is a major and variable source of error and rapidly increases with wear of the mating surfaces.

A trunnion bearing overcoming the above-listed difficulties is disclosed and claimed in Phil S. Potts' copending application, Serial No. 246,619, now Patent 2,712,965, which is assigned to the assignee of the present invention. My present invention is an improvement over the invention of the aforesaid copending application, which invention was made by said Phil S. Potts prior to my invention. I therefore do not herein claim anything shown or described in said Potts patent.

In the aforesaid Potts patent the relatively rotatable and stationary bearing members are provided with mating spherical seats with one of these spherical seats having depressions or lubricant chambers formed therein which are filed with lubricant under pressure. The lubricant supports the gravity and thrust loads on the bearing and automatically aligns the bearing members. This construction has been found to be quite satisfactory in operation and accomplishes the desired results. However, the manufacture of a spherical bearing surface is costly and complicated in comparison to the manufacture of a cylindrical bearing surface. Moreover, a bearing surface projecting at an angle from the shaft will support a greater thrust load than a spherical surface. Accordingly, my invention contemplates a bearing construction of the hydrostatic type wherein the manufacture of the bearing is inexpensive in that it can be made by simple turning and facing operations and its thrust capacity is greatly increased without increasing the friction of the bearing. Additionally, my invention contemplates the use of the waste lubricant discharged from the gravity load supporting chambers to pressurize the hydrostatic chambers which support the thrust load. Further, my invention contemplates a bearing construction wherein the cooperating bearing surfaces form lands surrounding the pressure chambers which serve to provide restrictive orifices automatically adjustable to provide the correct flow of lubricant consistent with the gravity and thrust loads thereon.

Accordingly, it is an object of my invention to provide a dynamometer characterized by a hydrostatic bearing construction of increased thrust capacity which is inexpensive and easy to manufacture.

It is a further object of my invention to utilize the waste lubricant from the hydrostatic chambers supporting the gravity load on the bearing to support the thrust load on the bearing.

It is a still further object of my invention to provide a bearing construction wherein the bearing surfaces serve as adjustable orifices to automatically adjust the bearing to varying conditions of gravity and thrust loading.

Further objects and advantages of my invention will become apparent and my invention will be better understood by reference to the accompanying drawing and description, and the features of novelty which characterize my invention will be pointed out with particularity in the claims annexed to and forming part of this specification.

In the drawing, Fig. 1 is a partial sectional elevational view of a dynamometer having a trunnion bearing made in accordance with my invention and taken along line 1—1 of Fig. 2.

Fig. 2 is a cross sectional view taken along line 2—2 of Fig. 1.

Fig. 3 is an enlarged fragmentary cross sectional view taken along the line 3—3 of Fig. 2.

Fig. 4 is an enlarged fragmentary cross sectional view of a modified form of my invention.

Briefly stated, in accordance with one aspect of my invention, a self-aligning hydrostatic bearing is provided to support the thrust and gravity loads on the bearing. The stationary bearing structure provides a cylindrical bearing surface which cooperates with a cylindrical bearing surface on the relatively rotatable bearing member to provide depressions or pockets to serve as hydrostatic chambers to support the gravity load on the bearing. The relatively rotatable member is also provided with collars providing surfaces at an angle to the cylindrical bearing surfaces which cooperate with surfaces disposed at a like angle on the relatively stationary member. These surfaces likewise cooperate to provide depressions or pockets to serve as hydrostatic chambers to support the thrust load on the bearing. Oil under sufficient pressure is supplied to the hydrostatic chambers on the cylindrical mating portions of the bearing surfaces to support the entire gravity load. Since no force is transmitted by metal to metal contact between the normally contacting portions of the mating bearing surfaces surrounding each pocket, these surfaces are slightly separated to provide leakage orifices. By positioning the thrust supporting chambers so that the flow from these leakage orifices must pass thereinto, load and thrust chambers are automatically adjusted in accordance with the load conditions imposed on the bearing.

In the drawing, I have shown a dynamoelectric machine, such as an eddy current dynamometer, provided with a rotor (not shown) mounted on a shaft 11 which is rotatably supported at each end thereof as by means of bearings 12 mounted in a bearing housing formed by the end frame 13. A trunnion nose 14 of the stator is supported for rotational movement, or cradled in, trunnion bearings, one of which is indicated generally at 15 and which in turn is supported in a bearing pedestal generally indicated at 16. As will be clearly understood by those skilled in the art, the electrodynamic forces between the rotor and the stator of the machine produce a torque on the stator tending to cause the stator to rotate in the pedestal 16. As will be further understood, apparatus such as a spring scale (not shown) is provided to indicate the torque tending to cause the stator to rotate.

Means are provided for cradling the trunnion bearing 15 within the pedestal 16 and comprises an inner bearing race 20 provided on trunnion nose 14 and a cylindrical outer bearing race 23 supported in a cradling member 21 and a cap member 22 which combine to provide an inner peripheral surface which is concave in the axial direction. The outer peripheral surface of the outer bearing race 23 is also concave in an axial direction to mate the cooperating surface of cradling member 21. This construction permits the exact alignment of outer race 23 with respect to inner race 20 of trunnion nose 14.

Referring specifically to Fig. 2, the outer race 23 is loosely held against rotation with respect to cap member 22 by an aligning pin 25 provided with a very loose fit with aligning hole 26 in race 23 and extending thereinto while secured in cap member 22 of pedestal 16. The pedestal 16 comprises a bearing supporting portion 27 to support cradling member 21. Labyrinth seals 36 and 37 are shown as being provided to retain the bearing lubricant in the housing.

The pedestal bearing support portion 27 is shown as being supported by uprights 38 and 39 which are connected to a base plate 40. Walls 69 of the pedestal form a sump for collecting the lubricant which drains from the bearing.

The inner race 20 provides a generally cylindrical bearing surface portion 20a which is journaled in a cylindrical surface portion 23a of bearing race 23 for supporting the gravity load on the bearing. Outer race 23 is also provided with surface portions 23d, providing bearing surfaces at an angle to 23a. These portions 23d cooperate with bearing surfaces on corresponding angled collars 20d of inner race 20 to carry the axial thrust transmitted between the machine and the pedestal 16. As shown, these surfaces project at an angle of 90° to the cylindrical bearing surface 20a.

In accordance with the present invention, I provide hydrostatic chambers for retaining a fluid, such as lubricating oil, under high pressure at circumferentially spaced points between mating bearing surfaces 20a and 23a. As illustrated, depressions 41 and 42, formed in inner race 20 provide such chamber. The bearing surface 20a forms narrow lands surrounding chambers 41 and 42 and cooperate with bearing surface 23a to prevent the free discharge of fluid from chambers 41 and 42. Additional fluid chambers are provided between bearing surface 23d and thrust collars 20d and are shown as depressions 47 and 48 formed in bearing surfaces 23d and extending to bearing surface 23a. Bearing surfaces 23d form narrow lands surrounding chambers 47 and 48 and cooperate with thrust collars 20d to prevent the free discharge of fluid from chambers 47 and 48.

Conduit means 43 and 44 extend through the outer bearing race 23 to provide communication between pressure chambers 41 and 42 and the mating recesses 45 and 46, respectively, formed in the bearing supporting portion 27 of the pedestal 16. Recesses 45 and 46 are in communication with a common supply source 59 through conduits 57 and 58, respectively. A flow restricting means 61 is placed in each of the communication means 57 and 58 of fluid chambers 41 and 42 to equalize the rate of flow of lubricant into chambers 41 and 42, respectively, regardless of the relative pressure in these chambers.

In operation, a fluid under pressure from a common supply 59 is introduced into the bearing through recesses 45 and 46 which are in communication with chambers 41 and 42. The restrictors 61 result in a pressure drop to, say, one-half the supply pressure under normal operating conditions. The restrictors 61, therefore, make the system self-regulating in that when the rate of fluid flow tends to increase, the restrictors 61 will cause a decrease in pressure on their outlet side to reduce the rate of flow. The outlets of the restrictors 61 are connected to hydrostatic chambers 41 and 42 wherein the pressure exerted by the fluid lifts the gravity load on the bearing 15 to separate surfaces 20a and 23a to provide leakage orifices, or clearance e. In Fig. 3, clearance e is shown in exaggerated form to illustrate more clearly the functioning of the bearing. The dimensions of the chambers 41 and 42 are such that the oil pressure therein times the area of the chambers plus the lifting force of the oil in the clearance e will support the cradled element of the dynamometer by the reaction of the oil between the inner and outer races 20 and 23, respectively, so that there is no contact between these races during use. Should the pressure in the pressure pads exceed that pressure which is required to support the cradled element, the clearance e will automatically increase to permit a greater flow of oil therefrom, so that the required pressure in chambers 41 and 42 is automatically achieved and maintained. The result is an extremely small friction error in the cradling of the machine, since the only loss is the viscous friction of the fluid used.

The lubricant, emerging from clearance e, may not immediately fall unpressurized into the reservoir of pedestal 16 but passes into chambers 47 and 48. Clearances f and g between lands formed by bearing surface portion 23d and the mating bearing surface of the thrust collar 20d maintain the lubricant in chambers 47 or 48 under pressure, depending on direction of thrust. If the thrust is in the direction, say, to reduce clearance f, a fluid pressure buildup will occur in chamber 47 because of the decrease in clearance f. At the tame time, clearance g will become larger due to the axial movement of bearing race 20 and will permit the substantially free discharge of fluid therethrough. When clearance f is such that the fluid pressure in chamber 47 and in clearance f will exactly support the thrust load, a point of equilibrium is reached at which there is no contact between surface 23d and collar 20d. It is obvious that if the thrust load to be encountered will always be in one direction, only one hydrostatic chamber, such as 47 or 48, is needed adjacent each gravity load supporting chamber.

In Fig. 4 I have shown a modified form of my invention particularly adapted for use where there is more than limited rotational movement between bearing members 20 and 23. In this form, chamber 42a is located on the relatively fixed bearing member 23 to facilitate the introduction of lubricant under pressure thereto.

It will be observed that this construction provides a hydrostatic bearing construction wherein only turned or faced bearing surfaces are required for supporting the gravity and thrust loads and wherein the waste fluid from the pressure chambers supporting the gravity load is routed through automatically adjusted orifices into pressure chambers for supporting the thrust load on the bearing.

I do not intend to limit the invention to the use of any particular number of pressure chambers, as obviously any number of pressure chambers could be used within the teaching and scope of this invention. Moreover, it will be readily apparent that where there is limited relative rotational movement therebetween, the pressure chambers for supporting either the gravity or the thrust loads may be on either or both the inner and outer race members. Additionally, while I have shown the thrust supporting chambers in axial alignment with the gravity supporting chambers, it will be readily apparent that this arrangement is not essential to the successful operation of my invention within the teachings thereof, so long as fluid passes through the thrust and gravity load supporting chambers serially.

While I have illustrated and described particular embodiments of my invention, further modifications and improvements thereof will occur to those skilled in the art. I desire it to be understood, therefore, that my invention is not to be limited to the specific embodiments shown and the appended claims are intended to cover all modifications thereof which do not depart from the spirit and scope of my invention.

What I claim as new and desire to secure by Letters Patent of the United States is:

1. A hydrostatic bearing comprising a relatively stationary race and a relatively rotatable race, said bearing races each providing cylindrical mating surface portions and transverse mating surface portions, the cylindrical surface portion of said relatively stationary race providing a cavity surrounded by lands to prevent the unrestricted discharge of lubricant therefrom for containing a lubricant under pressure for supporting gravity loads on said bearing, said transverse portion of said relatively stationary bearing race providing a cavity extending to the cylindrical mating surface portion thereof and surrounded by lands to prevent the unrestricted discharge of lubricant for containing a lubricant for transmitting thrust between said race members, and a lubricant supply means in communication with said gravity load supporting cavity for providing lubricant under pressure thereto, said lubricant being discharged from said gravity load supporting cavity through the clearance between said bearing races and entering said thrust supporting cavity to support the thrust load on said bearing.

2. A hydrostatic bearing comprising a relatively stationary race and a relatively rotatable race, said bearing races each providing cylindrical and transverse mating surface portions, the cylindrical surface portion of one of said races providing a cavity surrounded by lands to prevent the unrestricted discharge of lubricant therefrom for containing a lubricant under pressure for supporting gravity loads on said bearing, a cavity provided in one of said transverse surfaces extending to the cylindrical surface portion thereof and otherwise surrounded by lands to prevent the unrestricted discharge of lubricant therefrom for containing a lubricant for transmitting thrust between said race members, and a lubricant supply means in communication with said gravity load supporting cavity for providing lubricant under pressure thereto, said lubricant being discharged from said gravity load supporting cavity through the clearance between said bearing races and entering said thrust supporting cavity to support the thrust load on said bearing.

3. A bearing as recited in claim 2, wherein said cavities are axially aligned.

References Cited in the file of this patent

UNITED STATES PATENTS

| | | |
|---|---|---|
| 1,607,318 | Spillmann | Nov. 16, 1926 |
| 1,906,715 | Penick | May 2, 1933 |
| 2,605,147 | Raichle et al. | July 29, 1952 |

FOREIGN PATENTS

| | | |
|---|---|---|
| 639,293 | Great Britain | June 28, 1950 |